US012368273B2

(12) United States Patent
Kawai et al.

(10) Patent No.: US 12,368,273 B2
(45) Date of Patent: Jul. 22, 2025

(54) COAXIAL CONNECTOR

(71) Applicant: SUMITOMO WIRING SYSTEMS, LTD., Mie (JP)

(72) Inventors: Kohei Kawai, Mie (JP); Akihiro Kon, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 503 days.

(21) Appl. No.: 17/949,550

(22) Filed: Sep. 21, 2022

(65) Prior Publication Data

US 2023/0101726 A1 Mar. 30, 2023

(30) Foreign Application Priority Data

Sep. 27, 2021 (JP) ................................ 2021-156359

(51) Int. Cl.
*H01R 43/048* (2006.01)
*H01R 103/00* (2006.01)

(52) U.S. Cl.
CPC ....... *H01R 43/048* (2013.01); *H01R 2103/00* (2013.01); *Y10T 29/5323* (2015.01)

(58) Field of Classification Search
CPC .. H01R 43/048; H01R 9/0518; H01R 13/426; Y10T 29/49123; Y10T 29/49208; Y10T 29/5323
USPC .................. 29/752, 747, 754, 857, 876, 881
See application file for complete search history.

(56) References Cited

U.S. PATENT DOCUMENTS 5,269,701 A * 12/1993 Leibfried, Jr. ......... H01R 24/44 439/578
9,954,302 B2 * 4/2018 Kamei .................. H01R 13/18

FOREIGN PATENT DOCUMENTS

JP 2019-153464 A 9/2019

* cited by examiner

*Primary Examiner* — Thiem D Phan
(74) *Attorney, Agent, or Firm* — Venjuris, P.C.

(57) ABSTRACT

A coaxial connector includes a housing and a retainer attached to the housing. The housing includes a terminal receiving portion into which a terminal is insertable from behind. The terminal includes a crimp portion crimped to have a polygonal cross-sectional shape, and a flange portion located forward of the crimp portion when the terminal has been inserted in the terminal receiving portion, the flange portion protruding circumferentially outward beyond the crimp portion. The retainer includes a fitting portion fitted around the crimp portion of the terminal including at least one corner of the crimp portion in an attached state in which the terminal has been received in the terminal receiving portion in a normal position and the retainer has been attached in an engagement position, and an abutment portion in abutment with the flange portion of the terminal from behind in the attached state.

3 Claims, 12 Drawing Sheets

COAXIAL CONNECTOR

CROSS-REFERENCE TO RELATED APPLICATIONS

This application is based on and claims priority from Japanese Patent Application No. 2021-156359, filed on Sep. 27, 2021, with the Japan Patent Office, the disclosure of which is incorporated herein in its entirety by reference.

TECHNICAL FIELD

The technology disclosed herein relates to coaxial connectors.

BACKGROUND

Japanese Patent Laid-open Publication No. 2019-153464 discloses an example of a coaxial connector that includes an outer housing ("housing") in which a terminal receiving chamber ("terminal receiving portion") is formed to receive a jack ("terminal") connected to a terminal of a coaxial cable, and a retainer attached to the outer housing to engage with (i.e., retain) the jack within the terminal receiving chamber. The jack has a circular rim ("flange portion") protruding circumferentially outward from the external contact, the external housing has a housing lance that retains the circular rim of the terminal received in the terminal receiving chamber, and the retainer includes engaging claws ("abutment portion") that are formed so as to be insertable into engaging holes ("retainer insertion holes") formed in the external housing and are for retaining the flange portion.

SUMMARY

For example, in a coaxial connector used in a location where an external force is applied to the cable during use, such as in a vehicle door, the terminal in the terminal receiving portion of the housing may be inadvertently rotated, causing the terminal contacts to rub against each other and become worn. To avoid this, some housings are provided with a stopper ("whirl-stop") to prevent the rotation of the terminal. A greater number of components and assembly steps are required for coaxial connectors in which a stopper is attached to the housing in addition to a retainer that retains and holds the terminal in the normal position. In addition, the formation of multiple insertion holes in the housing may reduce the strength of the connector, and also reduces the degree of freedom in the connector design.

The technology disclosed herein was completed in view of the situation described above, and an object of the present disclosure is to provide a coaxial connector with a simple configuration that can hold the terminal in the normal position in the terminal receiving portion while preventing rotation of the terminal.

A coaxial connector disclosed herein includes: a housing including a terminal receiving portion into which a terminal connected to a coaxial cable is insertable from behind; and a retainer configured to be attached to the housing, wherein the terminal includes: a crimp portion crimped to have a polygonal cross-sectional shape, and a flange portion located forward of the crimp portion in an insertion direction of the terminal when the terminal has been inserted in the terminal receiving portion, the flange portion protruding circumferentially outward beyond the crimp portion, the housing includes a retainer insertion hole that passes through a wall of the terminal receiving portion in a direction intersecting the insertion direction of the terminal, the retainer includes: a fitting portion configured to be fitted around the crimp portion of the terminal including at least one corner of the crimp portion in an attached state in which the terminal has been received in the terminal receiving portion in a normal position and the retainer has been inserted into the retainer insertion hole and attached in an engagement position, an abutment portion configured to be in abutment with the flange portion of the terminal from behind in the attached state, and a recess formed between the fitting portion and the abutment portion to set back the fitting portion toward an outer circumferential face of the terminal in the attached state.

According to the present disclosure, it is possible to provide a coaxial connector with a simple configuration that can hold the terminal in the normal position in the terminal receiving portion while preventing rotation of the terminal.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
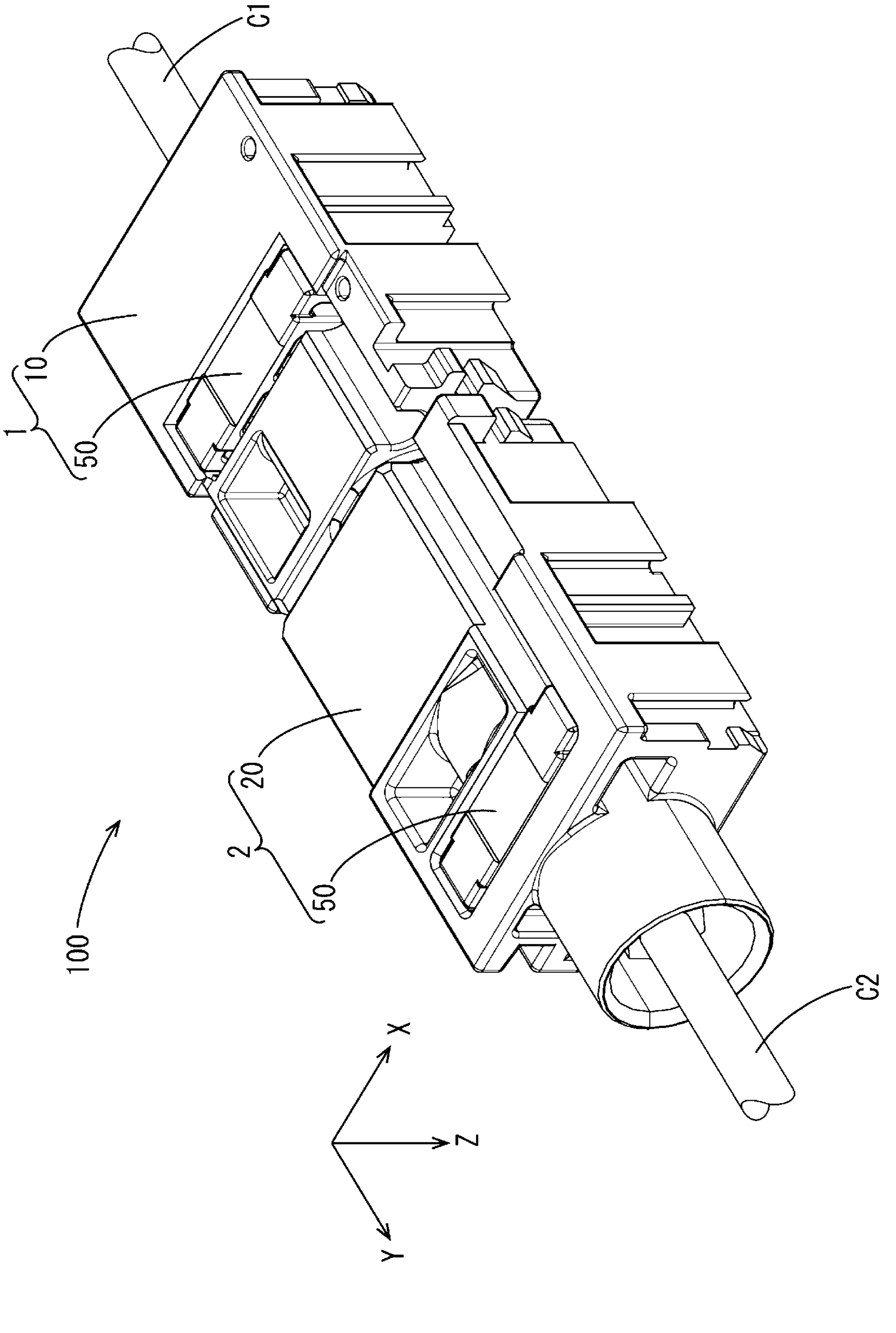
FIG. 1 is a perspective view showing an external appearance of a connector structure in which a coaxial connector of an embodiment is fitted to a partner coaxial connector.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS

First, embodiments of the present disclosure will be listed and described.

(1) A coaxial connector of the present disclosure includes: a housing including a terminal receiving portion into which a terminal connected to a coaxial cable is insertable from behind; and a retainer configured to be attached to the housing, wherein the terminal includes: a crimp portion crimped to have a polygonal cross-sectional shape, and a flange portion located forward of the crimp portion in an insertion direction of the terminal when the terminal has been inserted in the terminal receiving portion, the flange portion protruding circumferentially outward beyond the crimp portion, the housing includes a retainer insertion hole that passes through a wall of the terminal receiving portion in a direction intersecting the insertion direction of the terminal, the retainer includes: a fitting portion configured to be fitted around the crimp portion of the terminal including at least one corner of the crimp portion in an attached state in which the terminal has been received in the terminal receiving portion in a normal position and the retainer has been inserted into the retainer insertion hole and attached in an engagement position, an abutment portion configured to be in abutment with the flange portion of the terminal from behind in the attached state, and a recess formed between the fitting portion and the abutment portion to set back the fitting portion toward an outer circumferential face of the terminal in the attached state.

According to the configuration described in section (1) above, the rotation of the terminal is prevented as the fitting portion serves as a whirl-stop, and the terminal is prevented from slipping out from behind as the abutment portion serves as a retaining portion. As the retainer includes both the fitting portion and the abutment portion, the terminal may be prevented from rotating and slipping out simply by attaching the retainer. Note that, in a terminal in which a crimp portion is formed by crimping, at the rear of the flange portion, terminal fittings set around the coaxial cable, an incomplete crimp portion is formed that has a larger diameter than the crimp portion. In this regard, as the foregoing configuration has the recess between the abutment portion and the fitting portion of the retainer, and the recess serves as a relief for the incomplete crimp portion, the fitting portion can fit around the crimp portion without interference with the incomplete crimp portion. As a result, due to its simple configuration, the coaxial connector can maintain the terminal in the normal position in the terminal receiving portion while preventing rotation of the terminal.

(2) In the coaxial connector of the present disclosure, the retainer preferably includes an inclined portion formed on a retainer insertion end of the abutment portion, the inclined portion being inclined rearward while extending in a direction in which the retainer is inserted.

When the retainer is inserted through the retainer insertion hole with the terminal in a partially inserted position behind the normal position in the terminal receiving portion, the insertion end of the abutment portion initially comes into abutment with the radially protruding flange portion. According to the configuration described in section (2) above, as the rearward inclined portion is provided on this end, if the retainer is further pushed in, the flange portion is pressed forward by the inclined portion to move the terminal forward to the normal position. In this way, simply by plugging the retainer to the engagement position, the terminal may be moved from the partially inserted position to the normal position to be received in the housing.

(3) In the coaxial connector of the present disclosure, preferably, the retainer has a structure that is symmetrical about a longitudinal center plane when the retainer is attached to the housing.

According to the foregoing coaxial connector described in section (3) above, work efficiency is improved as the retainer can be attached without giving consideration to its front and rear orientation. Additionally, as the retainer can be used in either of the male and female coaxial connectors for receiving the male terminal and the female terminal, respectively, which are connected end-to-end, common parts can be used to facilitate parts control.

DETAILED DESCRIPTION OF EMBODIMENTS

Embodiments of the present disclosure will be described hereinafter. The present invention is not limited by these examples, but rather is indicated by the appended claims, and all changes that come within the claims and a meaning and range of equivalency of the claims are intended to be encompassed within the scope of the invention.

Embodiments

Embodiments of the present invention will be described hereinafter with reference to FIGS. 1 to 11.

Figure 3:
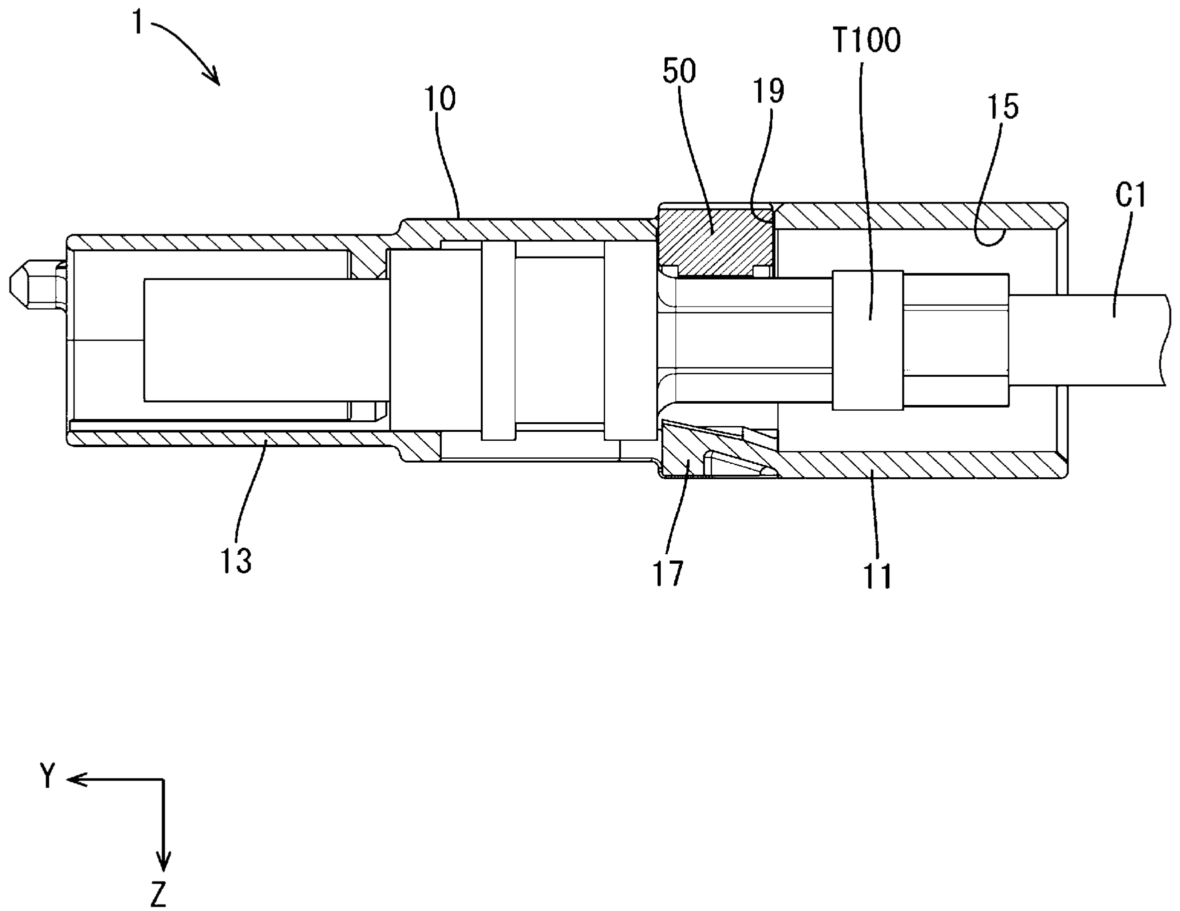
FIG. 3 is a partially cutaway side view of the coaxial connector in which a retainer is attached in the engagement position.

In the present disclosure, the side of the coaxial connector opposite to the partner coaxial connector, i.e., the left side of the coaxial connector shown in FIG. 3, will be hereinafter referred to as the front (the opposite side is the rear). In the following description, for convenience, the upper side in FIG. 3 is considered to be the upper side (the opposite side is considered to be the lower side); however, the coaxial connectors and connector structures can be used in any position. The description of the retainer is based on its position when the retainer is attached to the housing. The direction in which the retainer is inserted into the housing (in a downward direction) will be at times referred to as the insertion direction. Part or all of the X, Y, and Z-axes of the Cartesian coordinate system XYZ are indicated in portions of the drawings except FIGS. 4 and 5, and the directions of the axes are the same across the drawings. The direction of the Z-axis indicates the vertical direction, the direction of the Y-axis indicates the longitudinal direction, and the direction of the X-axis indicates the lateral direction. Where there are a plurality of identical members, one of the identical members may be indicated by a reference symbol while such indication may be omitted for the remaining members.

Connector Structure

Figure 2:
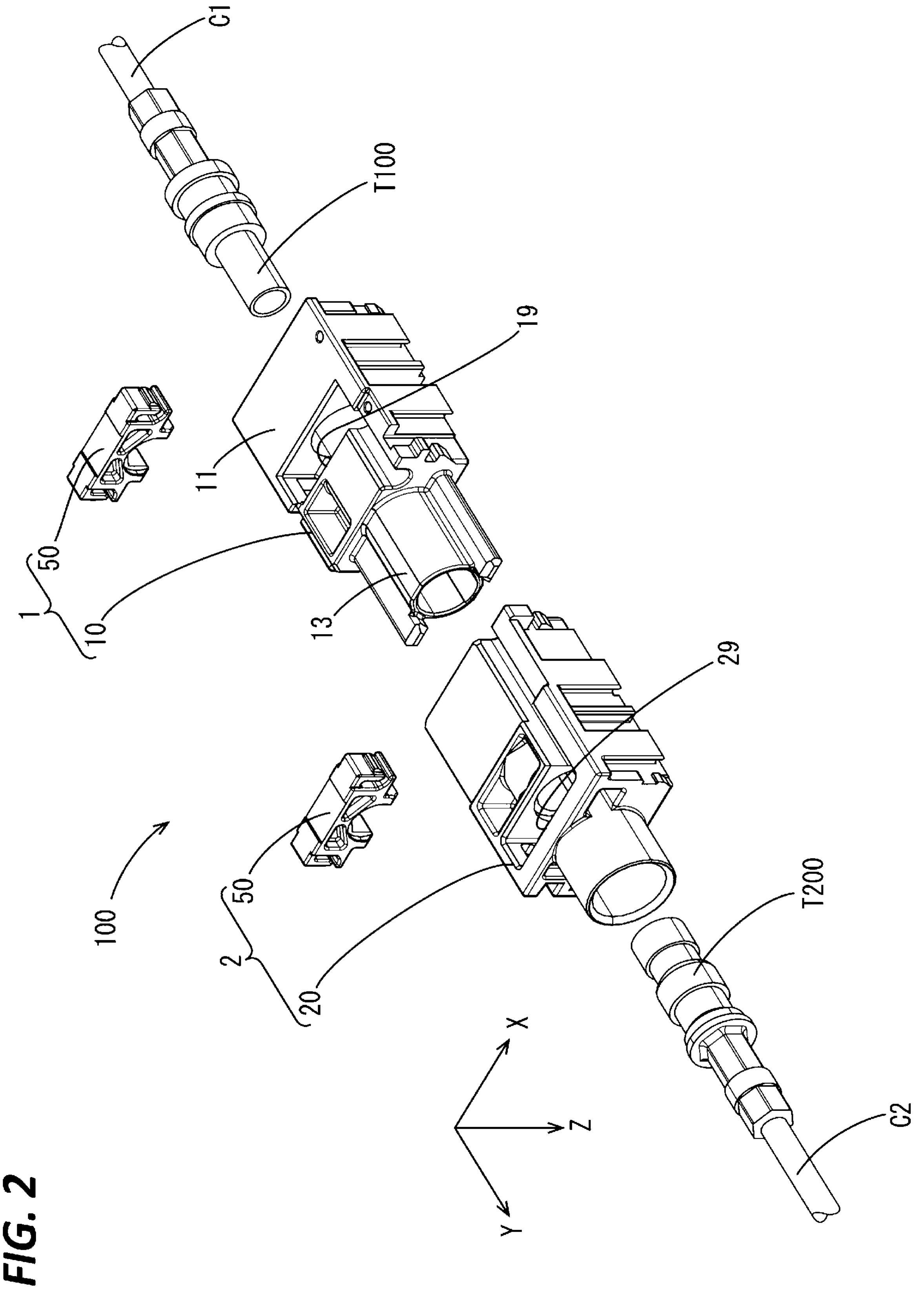
FIG. 2 is an exploded view of the connector structure of FIG. 1.

FIGS. 1 and 2 show a connector structure 100 that includes a coaxial connector 1 according to the present embodiment. The connector structure 100 includes a male coaxial connector 1 for receiving a male terminal T100 connected to a terminal of a coaxial cable C1, and a female coaxial connector 2 for receiving a female terminal T200 connected to a terminal of a coaxial cable C2. As shown in FIG. 2, the male coaxial connector 1 includes a male housing 10 having a cylindrical hood 13 projecting forward and a retainer 50 attached to the housing 10. Moreover, the female coaxial connector 2 includes a female housing 20 having a mating cylinder at the front into which the hood portion 13 is fittingly inserted, and a retainer 50 attached to the housing 20. Although not shown in the drawings, the connector structure 100 further includes a male frame that holds the male coaxial connector 1 and a female frame that holds the female coaxial connector 2, and the lock structures provided on the male and female frames can maintain the engagement between the two coaxial cable connectors 1 and 2.

As shown in FIG. 2, in the connector structure 100, the retainer 50 attached to the male housing 10 has the same structure as the retainer 50 attached to the female housing 20, allowing for the use of common parts. The following description will mainly focus on the male coaxial connector 1.

Housing

FIG. 3 is a partially cutaway side view of the coaxial connector 1. As shown in FIGS. 2 and 3, the housing 10 of the coaxial connector 1 has the approximately cylindrical hood portion 13 protruding forward from the front surface of a male-side main body 11 formed as an approximately rectangular parallelepiped. The housing 10 may be made of, for example, an integrally formed insulating synthetic resin. As shown in FIG. 3, the housing 10 has a terminal receiving portion 15 formed therein through which the male-side main body 11 and the hood portion 13 penetrate in the longitudinal direction. The terminal T100 connected to the terminal of the coaxial cable C1 is inserted from behind and received in the terminal receiving portion 15.

Figure 10:
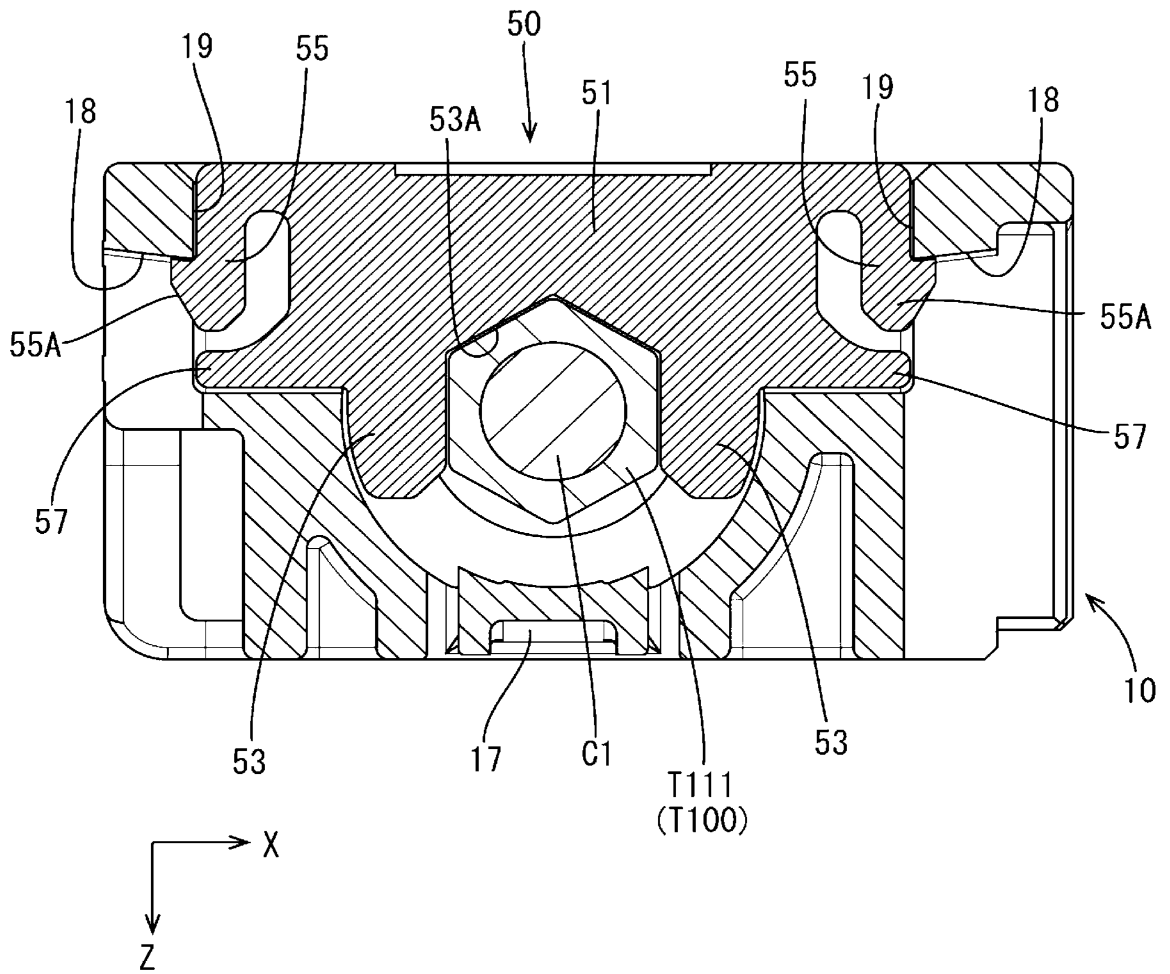
FIG. 10 is a cross-sectional view taken along line B-B' of FIGS. 9A and 9B.

As shown in FIG. 3 for example, a lance 17 is provided on the underside of the male-side main body 11 and formed in the shape of a cantilever with a free front end such that the lance can bend and protrude, in its natural state, in the vertical direction into the terminal receiving portion 15. A retainer insertion hole 19 is formed in the top surface of the male-side main body 11 and penetrates the upper wall of the terminal receiving portion 15. Formed laterally to the retainer insertion hole 19 in the male-side main body 11 are a pair of retainer engagement holes 18 penetrating the left and right walls of the terminal receiving portion 15 (FIG. 10).

Coaxial Cable

The coaxial cables C1 and C2, for example, have an inner conductor, a dielectric that surrounds the inner conductor, an outer conductor that is made of braided wire and other materials and surrounds the dielectric, and an insulator that covers the outer conductor. The coaxial terminal connected to the terminalized coaxial cable includes, for example, a center contact connected to the inner conductor, an insulator holding the center contact, an outer contact holding the insulator, and a metal sleeve crimped to the outer conductor.

Terminal

Figure 4:
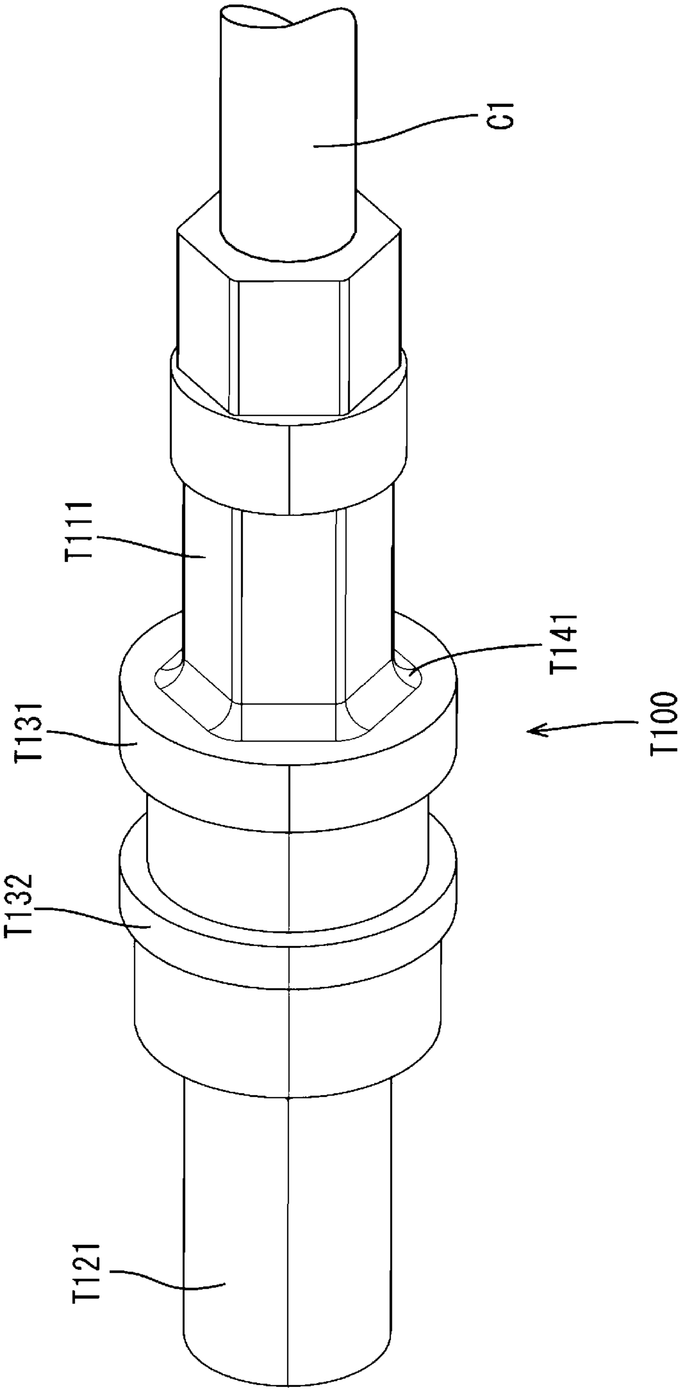
FIG. 4 is a perspective view showing the external appearance of one example of the terminal to be received in the coaxial connector.
Figure 5:
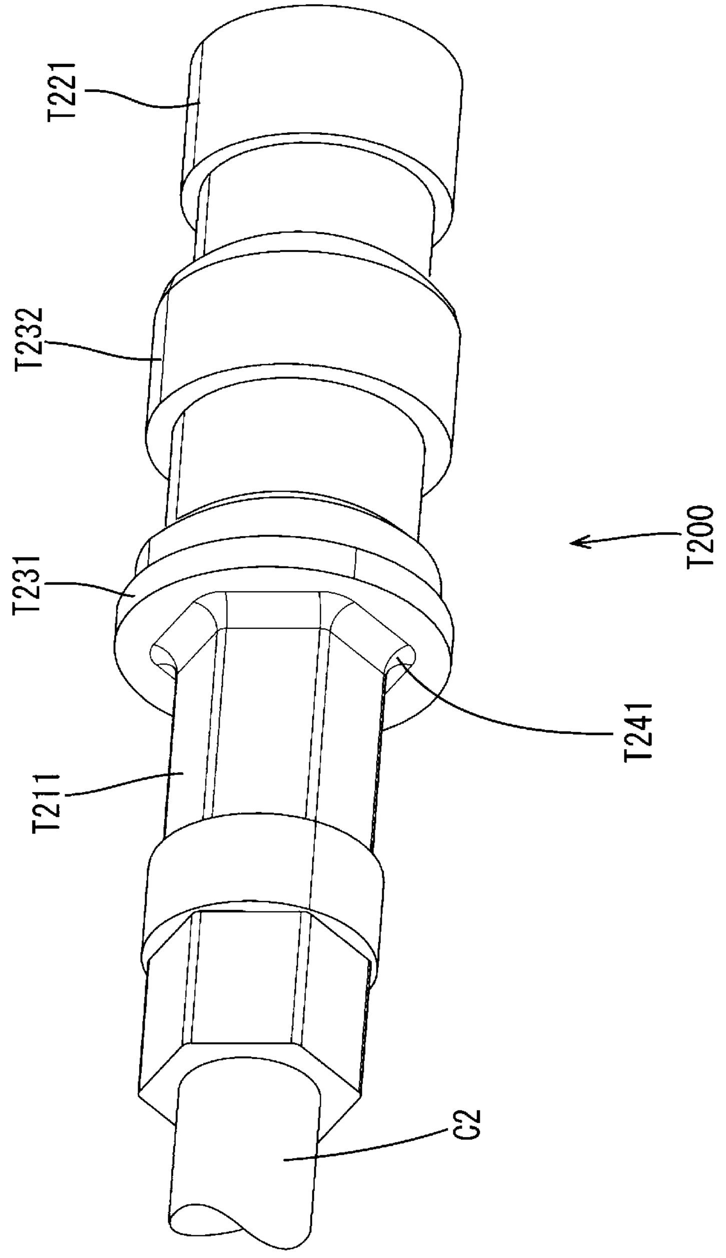
FIG. 5 is a perspective view showing the external appearance of another example of the terminal to be received in the coaxial connector.

FIG. 4 shows the male terminal T100 received in the coaxial connector 1, and FIG. 5 shows the female terminal T200 received in the coaxial connector 2.

The terminal T100 (T200) includes a crimp portion T111 (T211) crimped to the coaxial cable C1 (C2) at the proximal end, a cylindrical distal portion T121 (T221) connected at the distal end to the partner terminal, a flange portion T131 (T231) located forward of the crimp portion T111 (T211) and protruding circumferentially therefrom. Provided between the flange portion T131 (T231) and the distal portion T121 (T221) is a front flange portion T132 (T232) protruding so as to have approximately the same diameter as the flange portion T131 (T231).

The distal portion T221 of the female terminal T200 is formed to substantially tightly fit around the distal portion T121 of the male terminal T100. When the coaxial connector 1, which receives the male terminal T100 in the normal position, and the coaxial connector 2, which receives the female terminal T200 in the normal position, are fitted together, the distal portion T121 of the male terminal T100 is inserted into the distal portion T221 of the female terminal T200, bringing, for example, the center contacts held in the distal portions T121 and T221 into contact with each other to electrically connect the two terminals T100 and T200.

The crimp portion T111 (T211) is crimped to the coaxial cable C1 (C2) by setting terminal fittings around the outer peripheries of the terminalized coaxial cable C1 (C2) and then crimping the terminal fittings at the rear of the flange portion T131 (T231) so as to have a polygonal cross-sectional shape. The present embodiment shows an example in which the portion T111 (T211) is crimped to form a hexagon in cross-section. In the present embodiment, the crimp portion T111 of the male terminal T100 and the crimp portion T211 of the female terminal of T200 have the same external shape.

If the crimp portion T111 (T211) is crimped as described above, it is difficult to crimp the section all the way up to the border with the flange portion T131 (T231). Therefore, as shown in FIG. 4 (FIG. 5), an incomplete crimp portion T141 (T241) whose diameter is smaller than that of the flange portion T131 (T231) but larger than that of the crimp portion T111 (T211) is formed in the terminal T100 (T200) between the flange portion T131 (T231) and the crimp portion T111 (T211).

Retainer

Figure 6:
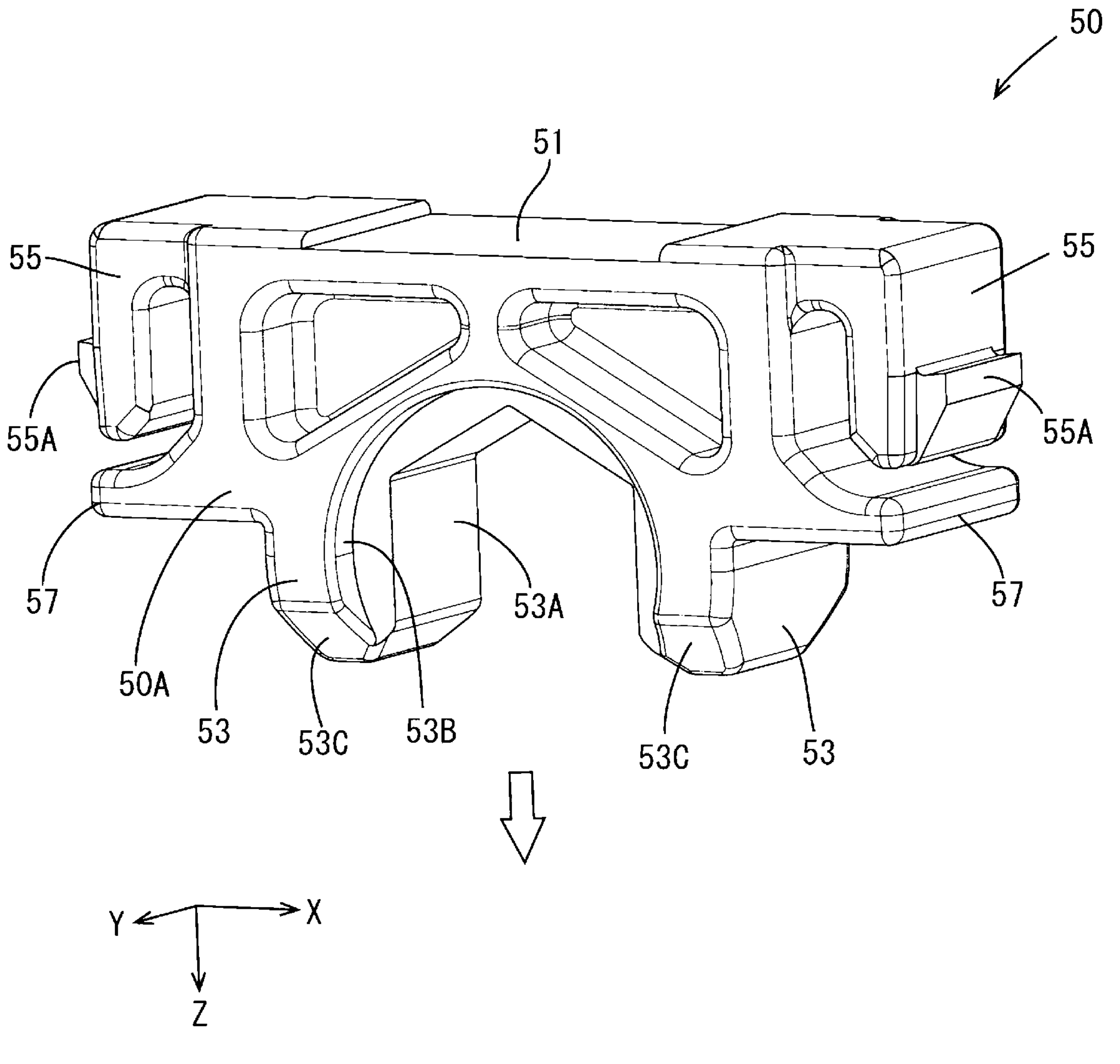
FIG. 6 is a perspective view of the retainer.
Figure 7:
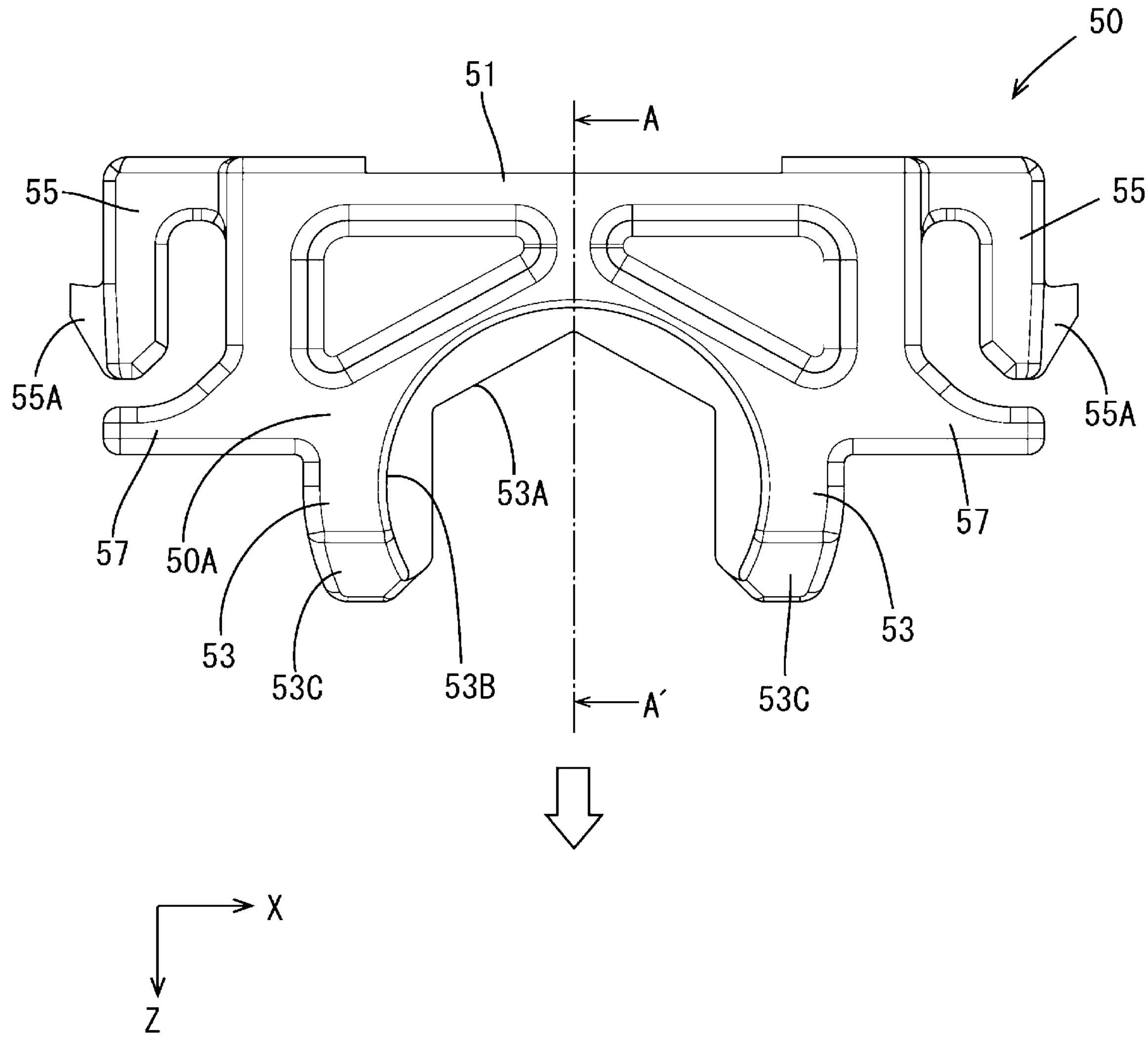
FIG. 7 is an elevation view (front and rear) of the retainer.
Figure 8:
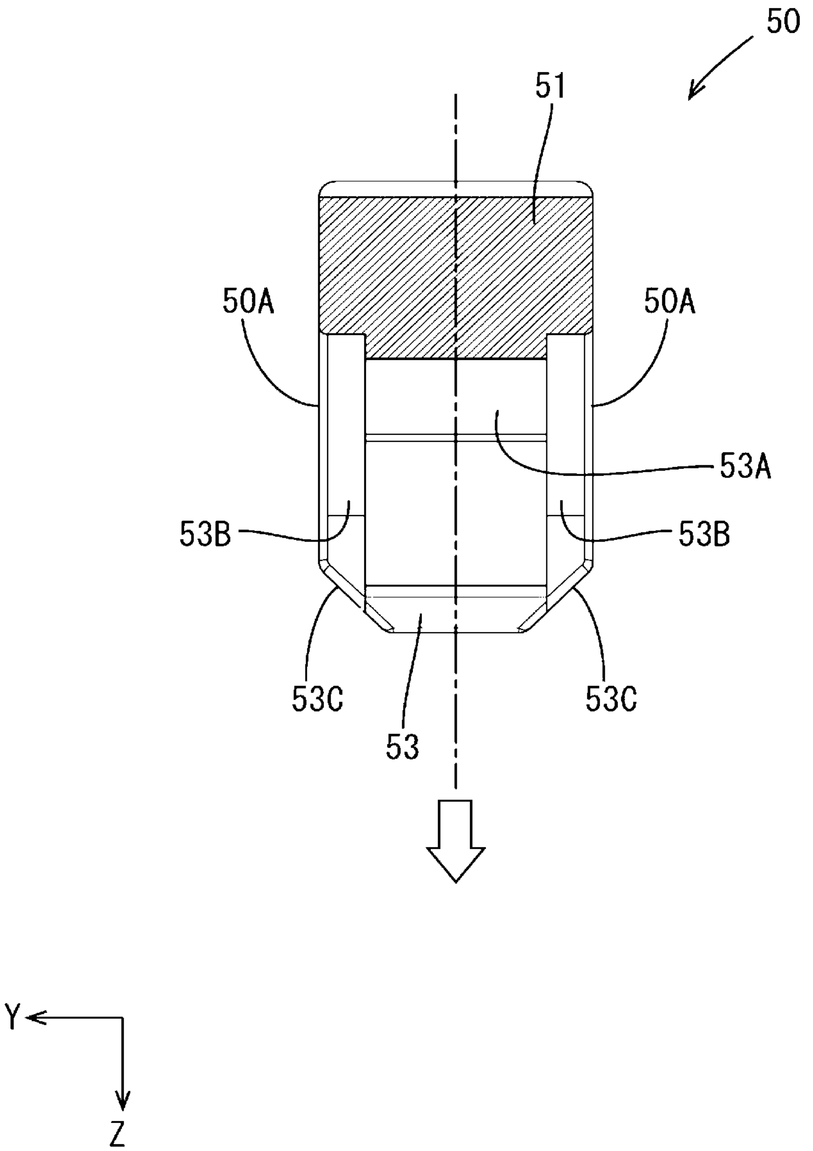
FIG. 8 is a cross-sectional view taken along line A-A' of FIG. 7.

FIGS. 6 to 8 show the retainers 50 attached to the male housing 10 and the female housing 20. The white arrows in FIGS. 6 to 8 indicate the direction in which the retainers 50 are inserted. As shown in, for example, FIG. 6, the retainer 50 includes a main body 51 and a pair of legs 53 bifurcating downward from the main body 51 in the direction of insertion of the retainer 50, i.e. downward, a pair of flexibly deformable arms 55 formed at the left and right sides of the main body 51 in the shape of a cantilever with a free lower end, and a pair of hip portions 57 protruding laterally outward from the main body 51 below the lower ends of the arms 55. Formed at the free, lower end of each arm 55 is an engagement claw 55A that protrudes laterally outward therefrom. As shown in FIG. 7 for example, the top surface of each engagement claw 55A is substantially horizontal, and the bottom surface is an inclined surface expanding outward while extending upward.

As shown in FIG. 8 for example, the main body 51, the legs 53, and the hip portions 57 are formed to provide an approximately flush front surface. This front surface constitutes an abutment portion 50A that, when the retainer 50 is attached in the engagement position as described below, is in abutment with the rear surface of the flange portion T131 of the terminal T100 in the normal position (see FIG. 9B).

As shown in FIGS. 6 and 7, formed between the legs 53 on the underside, or the insertion side, of the retainer 50 is a fitting portion 53A shaped to fit substantially tightly around the crimp portion T111 including at least one corner thereof. As shown in FIGS. 6 and 8, the front side of the fitting portion 53A is cut away to form a recess 53B so that the fitting portion 53A is set back toward the outer circumferential surface of the terminal T100 when the fitting portion 53A is fitted around the crimp portion T111. The recess 53B is formed with a longitudinal dimension that is approximately equal to or slightly larger than the distance from the rear surface of the flange portion T131 to the forward end of the crimp portion T111. The depth dimension of the recess 53B is larger than the height from the outer circumferential surface of the crimp portion T111 to the outer circumferential of the incomplete crimp portion T141, and approximately equal to or smaller than the height from the outer circumferential of the crimp portion T111 to the outer circumferential of the flange portion T131. Furthermore, as shown in FIGS. 6 and 8, the front surface of the protruding end of each leg 53, i.e., the insertion end of the abutment portion 50A has an inclined portion 53C formed thereon that is inclined rearward while extending downward.

The retainer 50 has a structure that is symmetrical about the longitudinal center plane P shown in FIG. 8. In other words, the rear surface of the retainer 50 has a shape identical to that of its front surface shown in FIG. 7.

Attachment of Retainer

The following describes how the retainer 50 is attached to the housing 10 in the engagement position with reference to FIGS. 9A to 11.

Figure 9A:
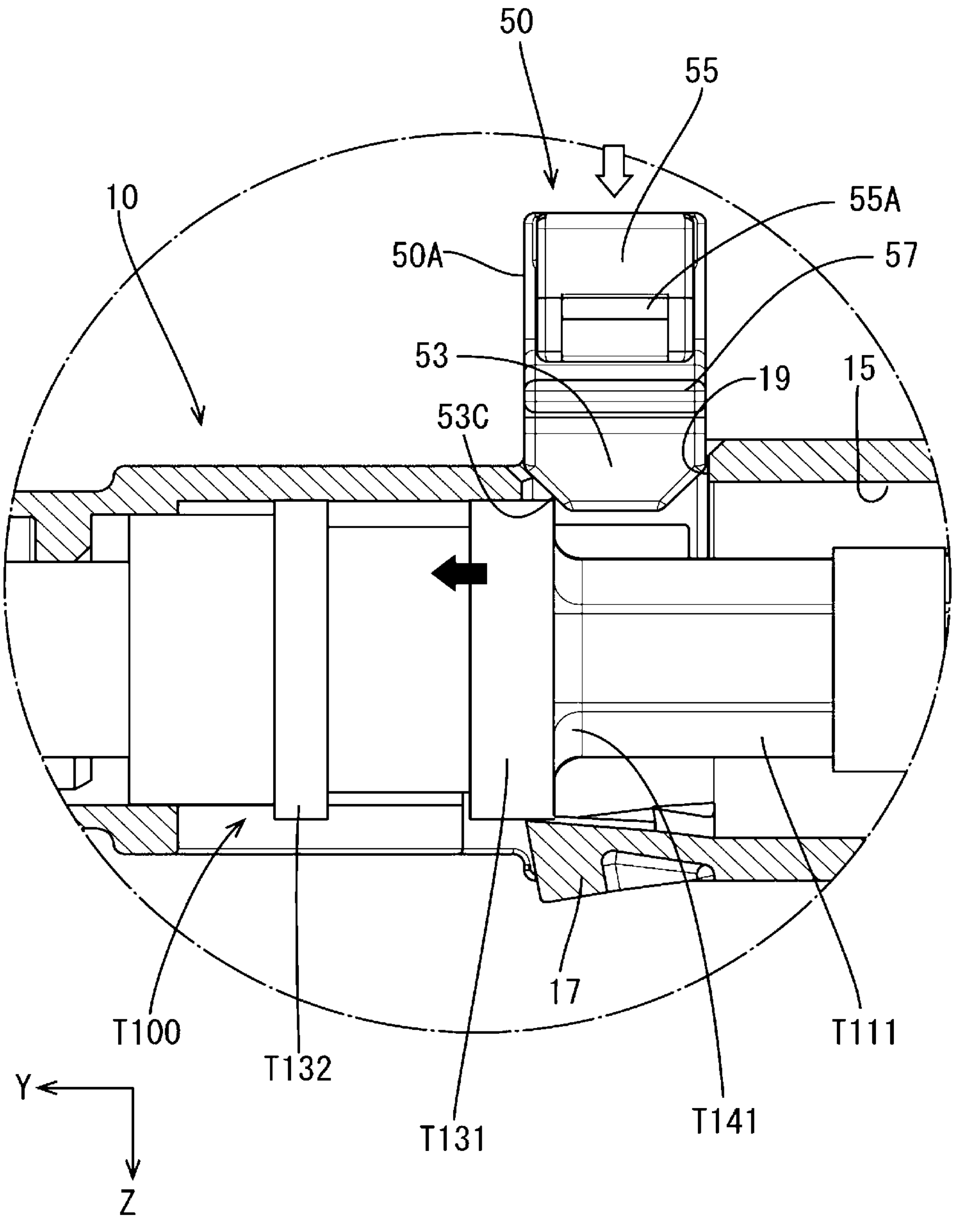
FIGS. 9A and 9B are explanatory views schematically showing how the terminal in a partially inserted position is pushed to the normal position by the retainer.

FIG. 9A shows how the retainer 50 is inserted through the retainer insertion hole 19 when the terminal T100, inserted from behind into the terminal receiving portion 15, is in a partially inserted position where it has not reached the normal position. In this state, the lance 17 on the underside of the housing 10 is in abutment with the flange portion T131 and bent downward. As indicated by the outline arrow in FIG. 9A, the retainer 50 is inserted downward, legs 53 first, while keeping the front abutment portion 50A on the front open edge of the retainer insertion hole 19. As the protruding ends of the legs 53 enter the terminal receiving portion 15, the inclined portions 53C formed on the front surfaces of the protruding ends of the legs 53 come into abutment with the rear corner of the flange portion T131 of the terminal T100, which is currently in the partially inserted position. If the retainer 50 continues to be pushed in to move the retainer 50 downward, the inclined portions 53C press the flange portion T131 forward, bringing the terminal T100 to the normal position as indicated by the black arrow of FIG. 9A.

Figure 9B:
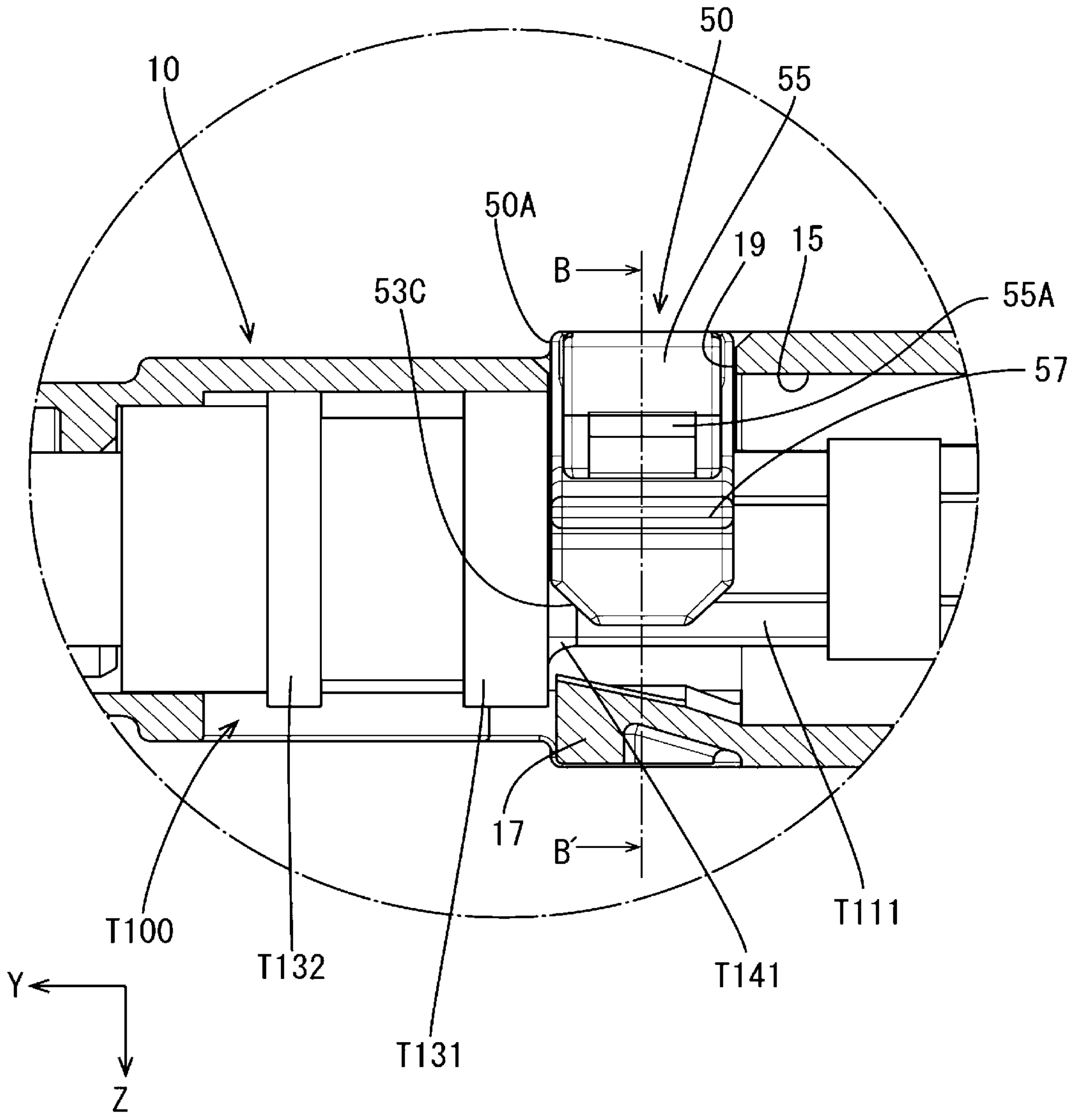

As shown in FIG. 9B, when the retainer 50 is pushed down and attached in the engagement position, the flange portion T131 moves forward of the front end of the lance 17, and the lance 17 is released from the biasing force and restored to its position behind the flange portion T131, thereby preventing rearward movement of the T131 and thus the terminal T100. At the same time, as the abutment portion 50A on the front face of the retainer 50 comes into abutment with the rear surface of the flange portion T131, the abutment portion 50A serves as a retaining portion to doubly ensure the prevention of rearward movement of the terminal T100.

As shown in FIG. 10, the engagement position refers to the position of the retainer 50 in which the hip portions 57 are pushed in until they come into abutment with the lower open edges of the respective retainer engagement holes 18. When the retainer 50 is pushed to the engagement position, the arms 55, having passed through the retainer insertion hole 19 while flexing and deforming toward the central axial, recover in shape with the upper surfaces of the engagement claws 55A abutting against the upper open edges of the retainer engagement holes 19. As a result, the retainer 50 is prevented from slipping out upward and engages with the housing 10.

Figure 11:
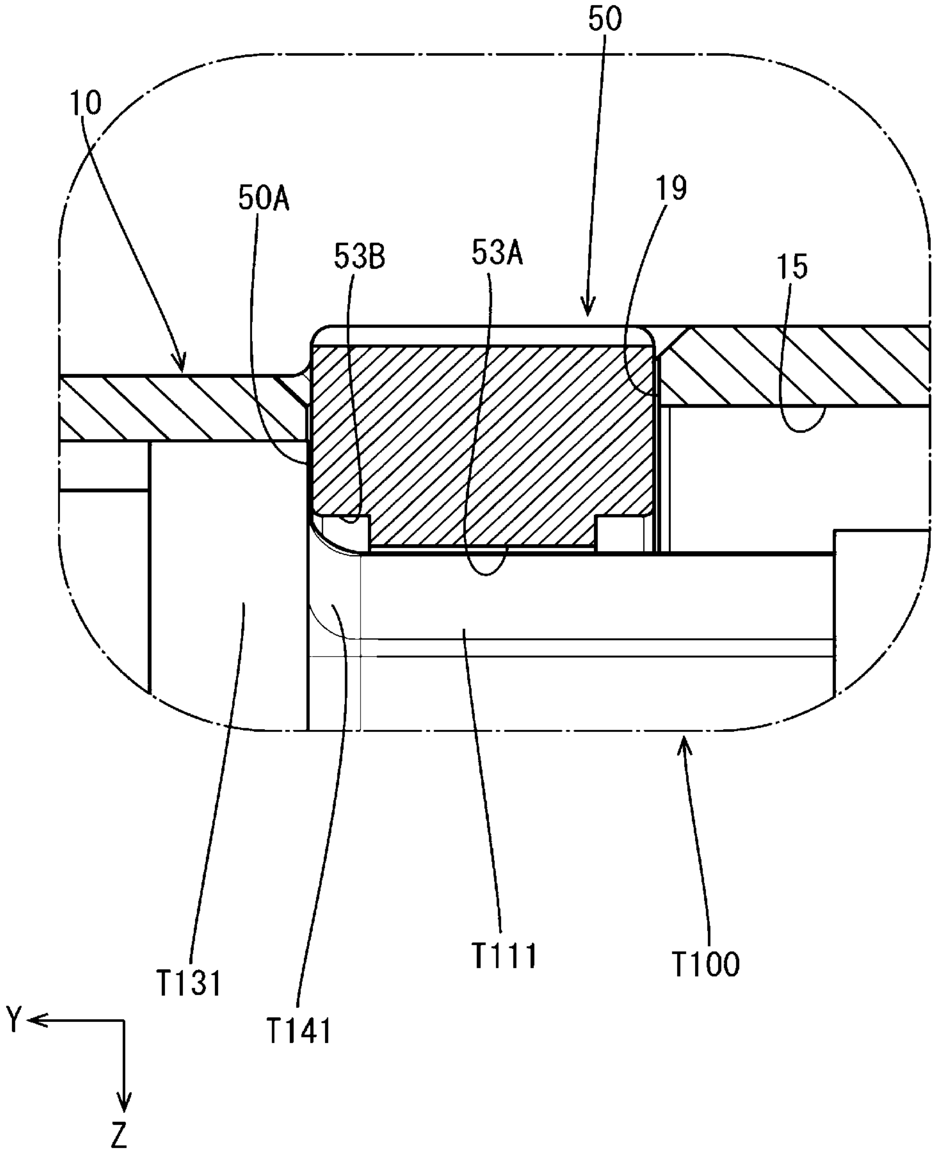
FIG. 11 is a partially enlarged view of a relevant portion of FIG. 3.

FIG. 11 is a partially enlarged view of the vicinity of the retainer 50 attached in the engagement position as shown in FIG. 3. As shown in FIGS. 10 and 11, when the retainer 50 is attached in the engagement position, the fitting portion 53A, formed on the underside of the retainer between the legs 53, is fitted substantially tightly around the crimp portion T111 of the terminal T100. The fitting portion 53A, by being fitted around the crimp portion T111 including at least one of its corners, serves as a whirl-stop (or a stopper) to prevent rotation of the terminal T100 when an external force is applied to the coaxial cable C1.

At this time, as shown in FIG. 11, the recess 53B of the retainer 50 is positioned opposite the incomplete crimp portion T141 formed between the flange portion T131 and the crimp portion T111 of the terminal T100. As the recess 53B serves as a relief for the incomplete crimp portion T141, the retainer 50 can be pushed to the engagement position for attachment without causing interference between the incomplete crimp portion T141 and the fitting portion 53A.

Effects of the Embodiment

Effects of the present embodiment will be described hereafter.

The coaxial connector 1 of the present embodiment includes the housing 10 having the terminal receiving portion 15 provided therein into which the terminal T100 connected to the coaxial cable C1 is inserted from behind, and the retainer 50 attached to the housing 10. The terminal T100 includes the crimp portion T111 crimped to form a polygonal circumferential shape, and the flange portion T131 located forward of the crimp portion T111 when the terminal T100 is inserted in the terminal receiving portion 15, the flange portion formed to protrude circumferentially outward beyond the crimp portion T111. The housing 10 includes a retainer insertion hole 19 that passes through a wall of the terminal receiving portion 15 in a direction intersecting the direction in which the terminal T100 is inserted. The retainer includes a fitting portion 53A fitted around the crimp portion T111 of the terminal T100 including at least one corner of the crimp portion T111 when the terminal T100 is received in the normal position in the terminal receiving portion 15 and the retainer 50 is inserted through the retainer insertion hole 19 and attached in an engagement position, the abutment portion 50A in abutment with the flange portion T131 of the terminal T100 from behind when the terminal T100 is in the normal position and the retainer 50 is in the engagement position, and the recess 53B formed between the fitting portion 53A and the abutment portion 50A to set back the fitting portion 53A toward the outer circumferential surface of the terminal T100 when the terminal T100 is in the normal position and the retainer is in the engagement position.

According to the coaxial connector 1 of the present embodiment, the rotation of the terminal T100 is prevented as the fitting portion 53A serves as a whirl-stop, and the terminal T100 is prevented from slipping out from behind as the abutment portion 50A serves as a retaining portion. As the retainer 50 includes both the fitting portion 53A and the abutment portion 50A, the terminal T100 may be prevented from rotating and slipping out simply by attaching the retainer 50. Note that, in a terminal in which a crimp portion T111 is formed by crimping, at the rear of the flange portion T131, terminal fittings set around the coaxial cable C1, the crimping is performed by gradually reducing the crimp stress on the coaxial cable C1 toward the border with the flange portion T131 in order to prevent the breakage of the cable in the crimp portion T111. Therefore, an incomplete crimp portion T141 (also known as a bell mouth) with a larger diameter than the crimp portion T111 is formed between the flange portion T131 and the crimp portion T111. In this regard, as the foregoing configuration has the recess 53B between the abutment portion 50A and the fitting portion 53A of the retainer 50, and the recess 53B serves as a relief for the incomplete crimp portion T141, the fitting portion 53A can fit around the crimp portion T111 while avoiding interference with the incomplete crimp portion T141. As a result, the simply configured coaxial connector 1 is provided that can maintain the terminal T100 in the normal position in the terminal receiving portion 15 while preventing the rotation of the terminal T100.

Moreover, in the coaxial connector 1 of the present embodiment, the retainer 50 includes the legs 53 bifurcating downward in the direction of insertion of the retainer 50 toward the housing 10. Additionally, the abutment portion 50A is formed on the front surface of the legs 53, the fitting portion 53A is formed on the insertion side of the retainer between the legs 53, and the front side of the fitting portion 53A is cut away to form a recess 53B so that the front side of the fitting portion 53A is set back toward the circumference of the terminal T100.

Furthermore, in the coaxial connector 1 of the present embodiment, the retainer 50 has inclined portions 53C formed on the retainer insertion end of the abutment portion 50A, the inclined portions 53C being inclined rearward in the direction in which the retainer is inserted.

When the retainer 50 is inserted through the retainer insertion hole 19 with the terminal T100 in a partially inserted position behind the normal position, the insertion end of the abutment portion 50A initially comes into abutment with the radially protruding flange portion T131. According to the coaxial connector 1 of the present embodiment, as the rearward inclined portions 53C are provided on this end, if the retainer 50 is further pushed in, the flange portion T131 is pressed forward by the inclined portions 53C to move the terminal T100 forward to the normal position. In this way, simply by plugging the retainer 50 to the engagement position, the terminal T100 may be moved from the partially inserted position to the normal position to be received in the housing.

Moreover, in the coaxial connector 1 of the present embodiment, the retainer 50 has a structure that is symmetrical about the longitudinal center plane P when the retainer 50 is attached to the housing 10.

According to the foregoing coaxial connector 1, work efficiency is improved as the retainer 50 can be attached without giving consideration to its front and rear orientation. Additionally, as the retainer 50 can be used in either of the male and female coaxial connectors 1, 2 for receiving the male terminal T100 and the female terminal T200, respectively, which are connected end-to-end, common parts can be used to facilitate parts control.

Other Embodiments

The present disclosure is not limited to the embodiment described in connection with the foregoing description and drawings. For example, the following embodiments also fall under the technical scope disclosed in the present invention.

(1) Although the coaxial connector of the foregoing embodiment is described as receiving one terminal, the present invention is not limited to this. In a coaxial connector that receives a plurality of terminals and to which one retainer is attached, the terminals may be prevented from being inadvertently rotated or slipping out by providing the retainer with a plurality of abutment portions (retaining portions), a plurality of fitting portions (whirl-stops), and a plurality of recesses (relief portions).

(2) The housing described in the foregoing embodiment is merely an example, and it may be formed differently from the above. The coaxial connectors of the present invention are not limited to those with connector structures having male and female connectors.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A coaxial connector, comprising:

a housing including a terminal receiving portion into which a terminal connected to a coaxial cable is insertable from behind; and a retainer configured to be attached to the housing, wherein the terminal includes:

- a crimp portion crimped to have a polygonal cross-sectional shape, and
- a flange portion located forward of the crimp portion in an insertion direction of the terminal when the terminal has been inserted in the terminal receiving portion, the flange portion protruding circumferentially outward beyond the crimp portion, the housing includes a retainer insertion hole that passes through a wall of the terminal receiving portion in a direction intersecting the insertion direction of the terminal, the retainer includes:

- a fitting portion configured to be fitted around the crimp portion of the terminal including at least one corner of the crimp portion in an attached state in which the terminal has been received in the terminal receiving portion in a normal position and the retainer has been inserted into the retainer insertion hole and attached in an engagement position,
- an abutment portion configured to be in abutment with the flange portion of the terminal from behind in the attached state, and
- a recess formed between the fitting portion and the abutment portion to set back the fitting portion toward an outer circumferential face of the terminal in the attached state.

2. The coaxial connector of claim 1, wherein the retainer includes an inclined portion formed on a retainer insertion end of the abutment portion, the inclined portion being inclined rearward while extending in a direction in which the retainer is inserted.

3. The coaxial connector of claim 1, wherein the retainer has a structure that is symmetrical about a longitudinal center plane when the retainer is attached to the housing.

* * * * *